United States Patent
Katsuno et al.

(10) Patent No.: US 10,947,373 B2
(45) Date of Patent: Mar. 16, 2021

(54) POLYPROPYLENE RESIN COMPOSITION FOR MICROPOROUS FILM AND USE OF POLYPROPYLENE RESIN COMPOSITION

(71) Applicant: JAPAN POLYPROPYLENE CORPORATION, Chiyoda-ku (JP)

(72) Inventors: Satoshi Katsuno, Yokkaichi (JP); Shinichi Kitade, Yokkaichi (JP)

(73) Assignee: JAPAN POLYPROPYLENE CORPORATION, Chiyoda-ku (JP)

( * ) Notice: Subject to any disclaimer, the term of this patent is extended or adjusted under 35 U.S.C. 154(b) by 164 days.

(21) Appl. No.: 16/307,360

(22) PCT Filed: Jun. 15, 2017

(86) PCT No.: PCT/JP2017/022118
§ 371 (c)(1),
(2) Date: Dec. 5, 2018

(87) PCT Pub. No.: WO2018/034048
PCT Pub. Date: Feb. 22, 2018

(65) Prior Publication Data
US 2019/0161603 A1    May 30, 2019

(30) Foreign Application Priority Data

Aug. 18, 2016  (JP) .............................. JP2016-160710

(51) Int. Cl.
*C08L 23/12* (2006.01)
*B01D 71/26* (2006.01)
*C08J 9/00* (2006.01)
*H01M 2/16* (2006.01)

(52) U.S. Cl.
CPC .............. *C08L 23/12* (2013.01); *B01D 71/26* (2013.01); *C08J 9/00* (2013.01); *H01M 2/16* (2013.01); *C08L 2203/16* (2013.01); *C08L 2203/20* (2013.01); *H01M 2/1653* (2013.01)

(58) Field of Classification Search
CPC . C08L 2205/025; C08L 23/12; C08L 2207/07
See application file for complete search history.

(56) References Cited

U.S. PATENT DOCUMENTS

| | | | |
|---|---|---|---|
| 3,426,754 A | 2/1969 | Bierenbaum et al. | |
| 3,679,538 A | 7/1972 | Druin et al. | |
| 3,801,404 A | 4/1974 | Druin et al. | |
| 3,920,785 A | 11/1975 | Druin et al. | |
| 2009/0219672 A1 | 9/2009 | Masuda et al. | |
| 2010/0227987 A1* | 9/2010 | Ito ........................... | C08F 10/06 526/114 |
| 2015/0004394 A1* | 1/2015 | Hotta ....................... | B32B 5/18 428/319.7 |
| 2015/0010747 A1 | 1/2015 | Hotta et al. | |
| 2015/0133590 A1* | 5/2015 | Klimke .................... | C08K 5/52 524/151 |
| 2015/0175789 A1* | 6/2015 | Klimke .................... | C08L 23/10 252/500 |

FOREIGN PATENT DOCUMENTS

| | | |
|---|---|---|
| CN | 102769115 B | 5/2015 |
| JP | 55-32531 B | 8/1980 |
| JP | 2009-275207 A | 11/2009 |
| JP | 2010-265414 A | 11/2010 |
| JP | 2011-256316 A | 12/2011 |
| JP | 2012-92213 A | 5/2012 |
| JP | 2012-102188 A | 5/2012 |
| JP | 2013-10890 A | 1/2013 |
| JP | 5427469 B2 | 2/2014 |
| JP | 2014-132068 A | 7/2014 |
| JP | 5731762 B2 | 6/2015 |
| WO | WO 2007/046226 A1 | 4/2007 |
| WO | WO 2013/125700 A1 | 8/2013 |
| WO | WO 2013/125702 A1 | 8/2013 |

OTHER PUBLICATIONS

International Search Report dated Sep. 19, 2017 in PCT/JP2017/022118 filed Jun. 15, 2017.

Extended European Search Report dated Nov. 14, 2019 in Patent Application No. 17841276.3, 9 pages.

Farhad Sadeghi, et al., "Microporous Membranes Obtained from Polypropylene Blends with Superior Permeability Properties" Journal of Polymer Science Part B: Polymer Physics, vol. 46, No. 2, XP055637980, Jan. 15, 2008, pp. 148-157.

Mahshid Maroufkhani, et al., "Melt Rheology of Linear and Long-Chain Branched Polypropylene Blends" Iranian Polymer Journal, vol. 24, No. 9, XP055637947, Sep. 21, 2015, pp. 715-724.

Seyed H. Tabatabaei, et al., "Rheological and Thermal Properties of Blends of a Long-Chain Branched Polypropylene and Different Linear Polypfopylenes" Chemical Engineering Science, vol. 64, No. 22, XP026667822, Nov. 16, 2009, pp. 4719-4731.

Yunli Fang, et al., "Properties of Blends of Linear and Branched Polypropylenes in Film Blowing" Canadian Journal of Chemical Engineering, vol. 86, No. 1, XP055637953, Feb. 1, 2008, pp. 6-14.

(Continued)

*Primary Examiner* — Michael M Dollinger
(74) *Attorney, Agent, or Firm* — Oblon, McClelland, Maier & Neustadt, L.L.P.

(57) ABSTRACT

The present invention relates to a polypropylene resin composition for a microporous film which can reduce the product defect rate due to stabilization of porous formation by stabilizing film formation and also can obtain a film suitably usable for a separator, a filtration membrane, a separation membrane and a filter since the microporous film can be thinned due to high rigidity, and more specifically, relates to a polypropylene resin composition for a microporous film wherein the composition comprises 5 to 30% by weight of polypropylene resin (X) having specific MFR, molecular weight distribution Mw/Mn by GPC, melt tension (MT), branching index g' and mm fraction of the propylene unit triads by $^{13}$C-NMR, satisfying specific conditions concerning gels and having a long chain branched structure and 95 to 70% by weight of polypropylene resin (Y) having a specific MFR and excluding the polypropylene resin (X).

12 Claims, No Drawings

(56) References Cited

OTHER PUBLICATIONS

Tara J. McCallum, et al., "The Rheological and Physical Properties of Linear and Branched Polypropylene Blends" Polymer Engineering and Science, vol. 47, No. 7, XP002726162, Jul. 1, 2007, pp. 1133-1140.

Seyed H. Tabatabaei, et al., Microporous Membranes Obtained from Polypropylene Blend Films by Stretching Journal of Membrane Science, Elsevier, vol. 325, No. 2, XP025655198, Dec. 1, 2008, pp. 772-782.

Office Action dated Oct. 30, 2020, in Chinese Patent Application No. 201780032630.9 (w/ English translation).

Zhang Xuzhi, "Engineering of Propylene Derivatives", p. 100, Beijing: Chemical Industry Press, May 31, 1995 (w/ English translation of related portion).

Lu Yongxiang, "Encyclopedia for the Pubic on Modern Science and Technology", The Volume of Technologies, p. 130, Hangzhou: Zhejiang Education Press, Jun. 30, 2001 (w/ English translation of related portion).

Office Action dated Dec. 15, 2020, in Japanese Patent Application No. 2017-118488 (w/ English translation).

\* cited by examiner

POLYPROPYLENE RESIN COMPOSITION FOR MICROPOROUS FILM AND USE OF POLYPROPYLENE RESIN COMPOSITION

TECHNICAL FIELD

The present invention relates to a polypropylene resin composition for a microporous film and use applications thereof. Specifically, the present invention relates to a polypropylene resin composition for a microporous film which can reduce the product defect rate due to stabilization of porous formation by stabilizing film formation and also can obtain a film suitably usable for a separator, a filtration membrane, a separation membrane and a filter since the microporous film can be thinned due to high rigidity of the polypropylene resin composition.

BACKGROUND ART

Polyolefin-based microporous films are used for various applications such as medical and industrial precision filtration membranes, separation membranes, separators for lithium ion batteries, separators for condensers, and fuel cell materials. In recent years, since lithium ion batteries are widely used for small electronic devices such as mobile phones, smart phones, and notebook computers, the demand for secondary batteries is increasing, and the demand for separators for batteries is also increasing. In addition, applications to hybrid electric vehicles and smart grid batteries as electricity storage produced by solar power generation and the like are also being processed, and the demand for large capacity lithium ion batteries is increasing.

Generally, a lithium ion battery is constituted by laminating a positive electrode obtained by applying lithium cobalt oxide or lithium manganate on the surface of an aluminum foil and a negative electrode obtained by applying carbon on the surface of a copper foil via a separator, and disposing the laminate in an electrolytic solution.

When charging the lithium ion battery, lithium ions are released from the positive electrode and intrude into the negative electrode, and at the time of discharging, the lithium ion is released from the negative electrode and moves to the positive electrode. Therefore, it is important for a separator used in the lithium ion battery to well permeate lithium ions.

Generally, a polyolefin-based microporous film is used as a separator for a lithium ion battery. For industrial production of polyolefin-based microporous film, phase separation methods (wet method) and stretching methods (α-crystal dry method, β-crystal dry method) are known.

In the wet method, since a polyolefin sheet containing a large amount of a solvent is stretched in a uniaxial or biaxial direction and then the solvent is extracted, not only the process is complicated but also the load on the environment is large, so that a large amount of solvent is used. Also, since the polyolefin resin to be used is limited to ultrahigh molecular weight polyethylene, it has a problem of poor heat resistance as compared with polypropylene.

In addition, the β-crystal dry method is a method of extruding a polypropylene resin added with a β-crystal nucleating agent from a T-die, cooling it with a cooling roll whose temperature is adjusted to about 120° C. to prepare a β-crystal polypropylene sheet, then heating and stretching the sheet to a film flow direction (MD direction) and a direction perpendicular to the MD direction (TD) to form cracks in the β crystal to form a film having a porous structure.

Since the β-crystal dry method does not use a solvent, the load on the environment is small, and since the film is stretched in the MD direction and the TD direction, a wide film can be obtained, which has an advantage of excellent productivity. However, since the film on which cracks are formed is stretched, there is a problem that film breakage frequently occurs in stretching in the TD direction. In order to solve this problem, for example, Patent Literature 1 (WO 2007/046226 A) discloses a biaxially oriented microporous film composed of a polypropylene resin composition of a polypropylene resin blended with preferably 0.1 to 50% by weight, more preferably 0.5 to 20% by weight, and most preferably 0.5 to 5% by weight of a high melt tension polypropylene having a long chain branch, and preferably 0.001 to 1% by weight, more preferably 0.005 to 0.5% by weight, and further preferably 0.05 to 0.2% of a β-crystal nucleating agent. Although the disclosed film has improved film formability, the microporous film obtained by the β-crystal dry method is originally oriented in the biaxial direction, thus it has been known that the film shrinks over time in the MD direction and the TD direction in long-term use under a high temperature atmosphere of a temperature equal to or higher than a relaxation temperature of the polypropylene resin, and there is a problem in practical use, so there has been a problem that the application to be used is limited.

On the other hand, the α-crystal dry method is a method of extruding a molten resin from a T-die or a circular die, and forming a film at a high draft ratio, then further applying heat treatment to the film to form a film having α-crystal structure with high regularity, followed by performing low temperature stretching and further high temperature stretching to form cracks at the crystal interface to form a film having a porous structure (see Patent Literature 2: JP S55-32531 B).

Since the α-crystal dry method does not use a solvent, the load on the environment is small, and the film has an advantage in heat resistance since polypropylene can be used. However, in the α-crystal dry method, it is necessary to form a molten resin extruded from a die into a film at a high draft ratio and strongly orient the molecular chains of the resin in the film flow direction, so that it is necessary to use a resin having a relatively high molecular weight, and lower the die temperature to increase the melt viscosity. However, when a film is formed at a high draft ratio in such a state, a phenomenon of tearing at the end of the die frequently occurs, so that the orientation in the film plane becomes nonuniform, and the formation of porosity becomes nonuniform, thus there is a problem that the defect rate is high.

As a method for solving this problem, there are a method of forming a film at a low draft ratio and a method of forming a film by raising the die temperature to 220° C. or more, and in either case, the orientation of the molecular chain becomes weak, and it becomes difficult to form a porous structure, thus the problem of forming a good porous structure while improving the defect rate has not been solved.

In recent years, in response to a demand for increasing the capacity of lithium ion batteries, a demand for reducing the thickness of separators have also increased, but as the thickness becomes thinner, problems such as elongation and wrinkling of the film are likely to occur when laminating with an electrode, thus the demand for increasing the rigidity of microporous film is increasing.

Various polypropylene-based microporous films obtained by the α-crystal dry method have been proposed. For example, Patent Literature 3 (JP 5731762 B2) discloses a microporous film composed of a polypropylene resin composition having an elongational viscosity of 18,000 to 40,000 Pa·s and a shear viscosity of 5,000 to 10,000 Pa·s, which is excellent in heat shrinkability.

However, the results of evaluation relating to forming stability and rigidity are not disclosed, and the polypropylene used is a blend of a linear homopolypropylene having an MFR of 0.4 g/10 minutes measured at 190° C. and a linear homopolypropylene having an MFR of 3.0 g/10 minutes measured at 190° C., and it is widely known that the linear homopolypropylene resin does not have strain hardening property during melt elongation deformation, and it is expected that the probability of improving the film formation instability caused by the tearing phenomenon at the end of the die is low.

Further, Patent Literature 4 (JP 5427469 B2) discloses a microporous film composed of a composition comprising 30% by weight, 50% by weight of a propylene homopolymer containing a long chain branch in a homopolypropylene having an MFR of 1.0 g/10 minutes or less. Since the disclosed microporous film is constituted by a propylene having a long relaxation time, shrinkage upon heating is improved, but since a propylene homopolymer containing a long chain branch is excessively contained, the propylene homopolymer containing a long chain branch forms a shish structure when forming a molten resin extruded from a die into a film at a high draft ratio. Thus, there has been a problem that cracks are less likely to form in the stretching process, and the porous structure becomes nonuniform. Furthermore, since PF814 used in Examples is a propylene homopolymer containing a long chain branch obtained by electron beam crosslinking and its stereoregularity is low, there has been a problem that the increase in the addition amount lowers the rigidity of the film.

CITATION LIST

Patent Literatures

Patent Literature 1: WO 2007/046226 A
Patent Literature 2: JP S55-32531 B
Patent Literature 3: JP 5731762 B2
Patent Literature 4: JP 5427469 B2

SUMMARY OF INVENTION

Technical Problem

In view of the above problems in the conventional art, it is an object of the present invention to provide a polypropylene resin composition for a microporous film which can reduce the product defect rate due to stabilization of porous formation by stabilizing film formation and also can obtain a film suitably usable for a separator, a filtration membrane, a separation membrane and a filter since the microporous film can be thinned due to high rigidity of the polypropylene resin composition.

Solution to Problem

The present inventors have made various studies to achieve the above object and found that, according to a polypropylene resin composition comprising a specific polypropylene resin having a long chain branched structure and a specific polypropylene resin, the product defect rate can be reduced due to stabilization of porous formation by stabilizing film formation, and also the obtained microporous film has high rigidity, thus can be suitably used for separators, filtration membranes, separation membranes and filters, and as a result, the present invention has been accomplished.

Namely, the first aspect of the present invention provides a polypropylene resin composition for a microporous film, wherein the composition comprises 5 to 30% by weight of polypropylene resin (X) having the following properties (i) to (vi) and having a long chain branched structure and 95 to 70% by weight of polypropylene resin (Y) having an MFR of 0.1 to 10 g/10 min and excluding the polypropylene resin (X):

Property (i): MFR is 0.1 to 30.0 g/10 minutes;
Property (ii): molecular weight distribution Mw/Mn by GPC is 3.0 to 10.0 and Mz/Mw is 2.5 to 10.0;
Property (iii): melt tension (MT) (unit: g) satisfies the following formula:

$$\log(MT) \geq -0.9 \times \log(MFR) + 0.7 \text{ or } MT \geq 15;$$

Property (iv): branching index g' is 0.30 or more and less than 0.95;
Property (v): mm fraction of propylene unit triads by $^{13}$C-NMR is 95% or more; and
Property (vi): when formed into an unstretched film having a thickness of 25 μm, the number of gels having a major axis of 0.5 mm or more is 10 particles/m$^2$ or less.

The second aspect of the present invention provides a polypropylene resin composition for a microporous film according to the first aspect of the present invention, wherein the polypropylene resin (Y) is a propylene homopolymer.

The third aspect of the present invention provides a polypropylene resin composition for a microporous film according to the first or second aspect of the present invention, wherein the composition has an elongational viscosity at a measurement temperature of 200° C. and an elongation rate of 10 s$^{-1}$ as determined by Cogswell method of 7,500 Pa·s to 41,000 Pa·s.

The fourth aspect of the present invention provides a separator for a battery composed of the polypropylene resin composition for a microporous film as defined in any of the first to third aspects of the present invention.

The fifth aspect of the present invention provides a filtration membrane composed of the polypropylene resin composition for a microporous film as defined in any one of the first to third aspects of the present invention.

The sixth aspect of the present invention provides a separation membrane composed of the polypropylene resin composition for a microporous film as defined in any one of the first to third aspects of the present invention.

Advantageous Effects of Invention

Since the polypropylene resin composition for a microporous film of the present invention satisfies the specific requirements, the product defect rate can be reduced due to excellent film formation stability and also the rigidity of the film is high, thus can be suitably used for separators, filtration membranes, separation membranes and filters.

DESCRIPTION OF EMBODIMENTS

Hereinafter, embodiments of the present invention will be described in detail for each item. The description of the elements described below is an example of the embodiment of the present invention, and the present invention is not limited to the contents thereof at all.

I. Polypropylene Resin Composition

1. Polypropylene Resin (X) Having Long Chain Branched Structure

In the polypropylene resin composition of the present invention, polypropylene resin (X) having the following properties (i) to (vi) and having a long chain branched structure is used.

Property (i): MFR is 0.1 to 30.0 g/10 minutes;

Property (ii): molecular weight distribution Mw/Mn by GPC is 3.0 to 10.0 and Mz/Mw is 2.5 to 10.0;

Property (iii): melt tension (MT) (unit: g) satisfies the following formula:

$$\log(MT) \geq -0.9 \times \log(MFR) + 0.7 \text{ or } MT \geq 15;$$

Property (iv): branching index g' is 0.30 or more and less than 0.95

Property (v): mm fraction of the propylene unit triads by $^{13}$C-NMR is 95% or more; and Property (vi): when formed into an unstretched film having a thickness of 25 μm, the number of gels having a major axis of 0.5 mm or more is 10 particles/m$^2$ or less.

Hereinafter, each of the properties defined in the present invention, the method for producing the polypropylene resin (X) having a long chain branched structure and the like will be specifically described.

(1) Property (i): MFR

The melt flow rate (MFR) of the polypropylene resin (X) having a long chain branched structure is 0.1 to 30.0 g/10 minutes, preferably 0.3 to 20.0 g/10 minutes, and more preferably 0.5 to 10.0 g/10 minutes. When the MFR is 0.1 g/10 minutes or more, good fluidity is obtained and the load of the extruder can be reduced with respect to extrusion molding. On the other hand, when the MFR is 30.0 g/10 minutes or less, the polypropylene resin can have sufficient strain hardening property and film formation stability is improved.

The MFR was measured under the conditions of 230° C. and 2.16 kg load in accordance with ISO 1133: 1997. The unit is g/10 minutes.

(2) Property (ii): Molecular Weight Distribution by GPC

The molecular weight distribution Mw/Mn (wherein Mw is the weight average molecular weight and Mn is the number average molecular weight) of the polypropylene resin (X) having a long chain branched structure by gel permeation chromatography (GPC) is 3.0 to 10.0, preferably from 3.5 to 8.0, and more preferably from 4.1 to 6.0.

Also, Mz/Mw (wherein Mz is the Z average molecular weight) is in the range of from 2.5 to 10.0, more preferably from 2.8 to 8.0, and further preferably from 3.0 to 6.0.

Those having a broader molecular weight distribution improve extrusion molding processability, but those having Mw/Mn in the range of 3.0 to 10.0 and Mz/Mw in the range of 2.5 to 10.0 are particularly excellent in extrusion molding processability.

Definitions of Mn, Mw and Mz are described in "Kobunshi Kagaku No Kiso (Fundamentals of Polymer Chemistry)" (edited by The Society of Polymer Science, Japan, Kagaku-Dojin Publishing Co., Inc., 1978) and the like, and these values can be calculated from the molecular weight distribution curve obtained by GPC.

Specific method for the measurement by GPC is as follows.

Apparatus: GPC (ALC/GPC 150C) manufactured by Waters Corporation

Detector: MIRAN 1A IR detector (measurement wavelength: 3.42 μm) manufactured by FOXBORO Column: AD806M/S (three in series) manufactured by SHOWA DENKO K.K.

Mobile phase solvent: o-dichlorobenzene (ODCB)

Measurement temperature: 140° C.

Flow rate: 1.0 ml/min

Injection volume: 0.2 ml

Sample preparation: Sample is dissolved at 140° C. over about 1 hour to prepare a solution with a sample concentration of 1 mg/mL using ODCB (containing 0.5 mg/mL BHT).

The retention volume obtained by GPC measurement is converted to the molecular weight using a calibration curve prepared in advance using standard polystyrenes (PSs). The standard polystyrenes used are the following trade names all manufactured by Tosoh Corporation.

F380, F288, F128, F80, F40, F20, F10, F4, F1, A5000, A2500 and A1000

0.2 mL of a solution in which ODCB (containing 0.5 mg/mL of BHT) is dissolved so that each of these standard PSs becomes 0.5 mg/mL is injected to prepare a calibration curve. The calibration curve uses a cubic equation obtained by approximation by the least squares method.

The following values are used for the equation for viscosity $[\eta] = K \times M^\alpha$ used for converting to the molecular weight.

$$PS: K = 1.38 \times 10^{-1}, \alpha = 0.7$$

$$PP: K = 1.03 \times 10^{-4}, \alpha = 0.78$$

In order to set the Mw/Mn and Mz/Mw within the above ranges, these can be easily adjusted by a method of changing polymerization temperature or polymerization pressure conditions, or as a general method, a method of adding a chain transfer agent such as hydrogen at the time of polymerization. The Mw/Mn and Mz/Mw can also be adjusted by using two or more kinds of catalysts and changing the amount ratio thereof.

(3) Property (iii): Melt Tension (MT)

The polypropylene resin (X) having a long chain branched structure satisfies the following formula (1).

$$\log(MT) \geq -0.9 \times \log(MFR) + 0.7 \text{ or } MT \geq 15 \quad \text{Formula (1)}$$

Here, MT represents melt tension when measured using CAPILOGRAPH 1B manufactured by Toyo Seiki Seisaku-Sho, Ltd. under the conditions of capillary: 2.0 mm in diameter, 40 mm in length, cylinder diameter: 9.55 mm, cylinder extrusion rate: 20 mm/minute, take-off speed: 4.0 m/minute, temperature: 230° C., and the unit is gram. However, when the MT of the sample is extremely high, the resin may break at a take-off speed of 4.0 m/minute. In such a case, the take-off speed is lowered by 0.1 m/minute, and a tension at the highest speed that can be taken is set as MT. The measurement conditions for MFR and the unit are as described above.

In general, the MT of the polypropylene resin is correlated with the MFR, thus sometimes described by a relational expression with the MFR. This provision is an index showing that the polypropylene resin (X) having a long chain branched structure has sufficient melt tension.

The polypropylene resin (X) having a long chain branched structure can be said to be a resin with sufficiently high melt tension as long as it satisfies the above formula (1), and since the melt tension is maintained in a film formation for forming a molten resin extruded from a die at a high draft ratio, the phenomenon of tearing at the end of the die is suppressed, and the uniformity of orientation in the film plane is maintained.

The polypropylene resin (X) having a long chain branched structure preferably satisfies the following formula (1)′, and more preferably satisfies the following formula (1)″.

$$\log(MT) \geq -0.9 \times \log(MFR) + 0.9 \text{ or } MT \geq 15 \quad \text{Formula (1)′}$$

$$\log(MT) \geq -0.9 \times \log(MFR) + 1.1 \text{ or } MT \geq 15 \quad \text{Formula (1)″}$$

It is not necessary to specifically determine the upper limit of MT. However, when MT exceeds 40 g, in the above measurement method, the take-off speed becomes extremely low, and measurement becomes difficult. In such a case, it is considered that the spreadability of the resin is also reduced, so it is preferably 40 g or less, more preferably 35 g or less, and further preferably 30 g or less.

In order to satisfy the above formula, the amount of long chain branch of the polypropylene resin (X) may be increased to increase the melt tension. It becomes possible by controlling selection of the catalyst, combinations when two or more kinds of catalysts are used, the amount ratio, and the prepolymerization conditions to introduce a lot of long chain branches.

(4) Property (iv): Branching Index g′

Examples of a direct index that the polypropylene resin (X) having a long chain branched structure has a long chain branched structure include branching index g′.

g′ of a component having an absolute molecular weight Mabs of 1,000,000 as determined by light scattering of the polypropylene resin (X) having a long chain branched structure is 0.30 or more and less than 0.95, preferably 0.55 or more and less than 0.95, more preferably 0.75 or more and less than 0.95, and further preferably 0.78 or more and less than 0.95. When g′ is less than 0.30, the main chain is small and the ratio of the side chain is extremely high. In such a case, melt tension may not be improved or a gel may be formed. On the other hand, g′ of 0.95 to 1.05 means absence of branch, melt tension tends to be insufficient, and film formation stability may not be obtained.

g′ is given by the ratio of an intrinsic viscosity [η]br of a polymer having a long chain branched structure to an intrinsic viscosity [η]lin of a linear polymer having the same molecular weight, i.e., [η]br/[η]lin, and when a long chain branched structure exists, it takes a value smaller than 1.0.

The definition is described in, for example, "Developments in Polymer Characterization-4" (J.V. Dawkins ed. Applied Science Publishers, 1983) and is an index known to those skilled in the art.

g′ can be obtained as a function of the absolute molecular weight Mabs, for example, by using GPC equipped with a light scatterometer and a viscometer on the detector as described below.

The polypropylene resin (X) having a long chain branched structure preferably has a comb-like chain structure.

A specific method of calculating g′ is as follows.

Alliance GPCV2000 manufactured by Waters Corporation is used as a GPC apparatus equipped with a differential refractometer (RI) and a viscosity detector (Viscometer). Also, a multi-angle laser light scattering detector (MALLS) DAWN-E of Wyatt Technology Corporation is used as a light scattering detector. The detectors are connected in the order of MALLS, RI, and Viscometer. A mobile phase solvent is 1,2,4-trichlorobenzene (antioxidant Irganox 1076 manufactured by BASF Japan Ltd. added at a concentration of 0.5 mg/mL).

The flow rate is 1 mL/minute, and as a column, two columns of GMHHR-H(S) HT manufactured by Tosoh Corporation are connected in series and used. The temperature of the column, sample injector and each detector is 140° C. The sample concentration is 1 mg/mL, and the injection volume (sample loop volume) is 0.2175 mL.

To determine the absolute molecular weight (blabs), the root mean square radius of gyration (Rg) obtained from MALLS, and the intrinsic viscosity ([η]) obtained from Viscometer, calculation is conducted using the data processing software ASTRA (version 4.73.04) attached to MALLS, with reference to the following literatures.

Reference literatures:
"Developments in Polymer Characterization-4" (J.V. Dawkins ed. Applied Science Publishers, 1983. Chapter 1.)
Polymer, 45, 6495-6505 (2004)
Macromolecules, 33, 2424-2436 (2000)
Macromolecules, 33, 6945-6952 (2000)

The branching index g′ is calculated as the ratio ([η]br/[η]lin) of the intrinsic viscosity ([η]br) obtained by measuring a sample with the Viscometer to the intrinsic viscosity ([η]lin) separately obtained by measuring the linear polymer.

When a long chain branched structure is introduced into a polymer molecule, the radius of gyration becomes small compared to that of a linear polymer molecule having the same molecular weight. The smaller the radius of gyration, the lower the intrinsic viscosity. Therefore, as the long chain branched structure is introduced, the ratio ([η]br/[η]lin) of the intrinsic viscosity ([η]br) of the branched polymer to the intrinsic viscosity ([η]lin) of the linear polymer having the same molecular weight becomes small.

Therefore, when the branching index g′ ([η]br/[η]lin) is smaller than 1.0, it means that the polymer molecule has a long chain branched structure.

As a linear polymer for obtaining the [η]lin, a commercially available homopolypropylene (NOVATEC PP (registered trademark) grade name: FY6 manufactured by Japan Polypropylene Corporation) is used. Since it is known as the Mark-Houwink-Sakurada equation that there is a linear relationship between the logarithm of [η]lin of the linear polymer and the logarithm of the molecular weight. Therefore, [η]lin can be obtained by appropriate extrapolation into the low molecular weight side or high molecular weight side.

In order to make the branching index g′ 0.30 or more and less than 0.95, it is achieved by introducing a lot of long chain branches, and it becomes possible by controlling the selection of catalysts and combinations thereof, the amount ratio thereof, and the prepolymerization conditions to perform polymerization.

(5) Property (v): mm Fraction of Propylene Unit Triads by $^{13}$C-NMR

The mm fraction of the propylene unit triads obtained by $^{13}$C-NMR of the polypropylene resin (X) having a long chain branched structure is 95% or more, preferably 96% or more, and more preferably 97% or more.

The mm fraction is the ratio of the propylene unit triads in which the direction of methyl branch in each propylene unit is the same in arbitrary propylene unit triads composed of head-to-tail bonds in the polymer chain, and the upper limit is 100%. The mm fraction is an index showing that the configuration of the methyl group in the polypropylene molecular chain is isotactically controlled, and the higher mm fraction means that it is highly isotactically controlled. When the mm fraction is 95% or more, the film can be made to have high rigidity.

The method of measuring the mm fraction of the propylene unit triads by $^{13}$C-NMR is as follows.

375 mg of the sample is completely dissolved in 2.5 ml of deuterated 1,1,2,2-tetrachloroethane in an NMR sample tube (10 φ) and then measured by the proton complete decoupling method at 125° C. For the chemical shift, the central peak of the three peaks of deuterated 1,1,2,2-tetrachloroethane is set at 74.2 ppm. The chemical shifts of other carbon peaks are determined with reference to this.

Flip angle: 90 degree
Pulse interval: 10 seconds
Resonance frequency: 100 MHz or more
Number of integrations: 10,000 or more
Observation area: −20 ppm to 179 ppm
Number of data points: 32768

The mm fraction is analyzed by using the $^{13}$C-NMR spectrum measured under the above conditions. Assignment of spectra is conducted with reference to Macromolecules, (1975) vol. 8, page 687 and Polymer, vol. 30, page 1350 (1989).

A more specific method of determining the mm fraction is described in detail in paragraphs [0053] to [0065] of JP 2009-275207 A, and the mm fraction is determined in accordance with this method also in the present invention.

In order to set the mm fraction within the above range, it is possible with a polymerization catalyst that achieves a highly crystalline polymer, and it is preferable to polymerize using a metallocene catalyst.

(6) Property (vi): Number of Gels

When the polypropylene resin (X) having a long chain branched structure is formed into an unstretched film having a thickness of 25 μm, the number of gels having a major axis of 0.5 mm or more is 10 gels/m$^2$ or less. Preferably, when formed into an unstretched film having a thickness of 25 μm, the number of gels having a major axis of 0.5 mm or more is 10 gels/m$^2$ or less and the number of gels having a major axis of 0.2 mm or more and less than 0.5 mm is 50 gels/m$^2$ or less. More preferably, when formed into an unstretched film having a thickness of 25 μm, the number of gels having a major axis of 0.5 mm or more is 10 gels/m$^2$ or less, the number of gels having a major axis of 0.2 mm or more and less than 0.5 mm is 50 gels/m$^2$ or less, and the number of gels having a major axis of 0.1 mm or more and less than 0.2 mm is 100 gels/m$^2$ or less. When the number of gels is within this range, cracks occurring in the gel portion during stretching can be suppressed in the stretching process, and stretchability is improved.

The unstretched film can be prepared by a conventional film forming apparatus. For example, an unstretched film can be prepared by charging a sample into a conventional extruder equipped with a T-die, extruding under appropriate conditions and taking it with a conventional film take-off machine. The number of gels of the prepared unstretched film can be counted by a conventional defect detector. It is convenient to count the number of gels between the take-off machine and a winder, at the center of the film. It is recommended to appropriately set the inspection width, the inspection length and the number of inspections and calculate the average value of the values obtained for each size section in terms of unit area. Details will be described in the following examples.

(7) Other Properties of Polypropylene Resin (X) Having Long Chain Branched Structure As an additional feature of the polypropylene resin (X) having a long chain branched structure, the strain hardening degree (λmax (0.1)) in the measurement of elongational viscosity at a strain rate of 0.1 s$^{-1}$ is 6.0 or more, and preferably 8.0 or more.

The strain hardening degree (λmax (0.1)) is an index representing strength during melting, and when this value is large, there is an effect of improving melt tension. As a result, in the film formation, the ear tearing phenomenon at the end of the die is suppressed, the orientation in the film plane becomes uniform, and further, the molecular chains are uniformly stretched, so that the molecular chain orientation is excited, and the film rigidity is improved. Further, when the strain hardening degree is 6.0 or more, sufficient film formation stability is exhibited.

The calculation method of λmax (0.1) is described below.

The elongational viscosity in the case of a temperature 180° C. and a strain rate of 0.1 s$^{-1}$ is plotted on a double logarithmic graph with time t (sec) on the horizontal axis and elongational viscosity ηE (Pa·sec) on the vertical axis. In the double logarithmic graph, the viscosity immediately before the occurrence of strain hardening is approximated by a straight line.

Specifically, first, the slope at each time when plotting the elongational viscosity with respect to time is obtained. In this regard, considering that the measurement data of the elongational viscosity is discrete, various averaging methods are used. For example, a method in which the slope of the adjacent data is obtained and a moving average of several surrounding points is taken, and the like are used.

The elongational viscosity becomes a simple increasing function in the region of low amount of strain, gradually approaches a constant value, and when strain hardening does not occur, coincides with the Trouton viscosity after a sufficient time elapses. However, when strain hardening occurs, the elongational viscosity starts to increase with time generally from an amount of strain (=strain rate×time) of approximately 1. That is, the slope tends to decrease with time in the low strain region, but it tends to increase inversely from an amount of strain of approximately 1, and there is an inflection point on the curve when the elongational viscosity is plotted with respect to time. Therefore, in the range of an amount of strain of approximately 0.1 to 2.5, a point where the slope of each time obtained above takes the minimum value is obtained, a tangent line is drawn at that point, and a straight line is extrapolated until the amount of strain becomes 4.0. The maximum value (ηmax) of elongational viscosity ηE until the amount of strain becomes 4.0 is obtained, and the viscosity on the approximate straight line up to that time is set as ηlin. ηmax/ηlin is defined as λmax (0.1).

As an additional feature of the polypropylene resin (X) having a long chain branched structure, it is preferable that the melting point is high. Specifically, the melting point obtained by differential scanning calorimetry (DSC) is preferably 145° C. or more, and more preferably 150° C. or more. When the melting point is in the above range, the heat resistance of the product is improved. The upper limit of the melting point is not particularly specified, but is usually 170° C.

The melting point is determined by differential scanning calorimetry (DSC), and defined as the temperature of the endothermic peak top measured when the temperature is once raised to 200° C. to erase thermal history, then the temperature is lowered to 40° C. at a temperature decreasing rate of 10° C./minute, and raised again at a temperature increasing rate of 10° C./minute.

As long as the above properties are satisfied, the polypropylene resin (X) may be a homopolypropylene, or propylene-α-olefin random copolymer containing a small amount of ethylene, an α-olefin such as 1-butene or 1-hexene, or other comonomers.

(8) Method for Producing Polypropylene Resin (X) Having Long Chain Branched Structure The polypropylene resin (X) having a long chain branched structure does not particularly limit the production method as long as it satisfies the above-mentioned properties. However, as a preferable production method from the viewpoint of satisfying the property (vi) regarding the number of gels, there is a method of using a macromer copolymerization method using a combination of metallocene catalysts. Examples of the macromer copolymerization method using a combination of metallocene catalysts include a method disclosed in JP 2009-57542 A.

This method is a method capable of producing a polypropylene resin of a comb-like structure having a long chain branched structure, by using a catalyst in which a catalyst component of a specific structure having an ability to produce a propylene macromer and a catalyst component of a specific structure having an ability to copolymerize a propylene macromer and propylene are combined. According to this method, it is possible to produce a polypropylene resin having a long chain branched structure having targeted physical properties, by industrially effective methods such as bulk polymerization and gas phase polymerization, particularly in a single stage polymerization under conditions of practical polymerization temperature and polymerization pressure, and using hydrogen as a molecular weight modifier.

2. Polypropylene Resin (Y)

In the polypropylene resin composition of the present invention, polypropylene resin (Y) is used together with the above polypropylene resin (X) having a long chain branched structure.

The MFR of the polypropylene resin (Y) is 0.1 to 10 g/10 minutes, preferably 0.5 to 7 g/10 minutes, and more preferably 1.0 to 5 g/10 minutes. When the MFR is 0.1 g/10 minutes or more, good fluidity is obtained and poor extrusion during film formation can be reduced. On the other hand, when the MFR is 10 g/10 minutes or less, dispersibility of the polypropylene resin (X) in the polypropylene resin (Y) is enhanced, so that the appearance of the film is excellent.

The MFR was measured under the conditions of 230° C. and 2.16 kg load in accordance with ISO 1133: 1997. The unit is g/10 minutes.

The MFR of the polypropylene resin (Y) is easily adjusted by changing the polymerization temperature or polymerization pressure conditions, or by adding a chain transfer agent such as hydrogen during polymerization.

As additional features of the polypropylene resin (Y), the polypropylene resin (X) is excluded, the branching index g' is preferably 0.95 to 1.05, and the branching index g' is particularly preferably 1.00.

The polypropylene resin (Y) may be a homopolymer of propylene, or may be a copolymer of propylene and ethylene and/or an α-olefin having 4 to 20 carbon atoms. From the viewpoint of heat resistance and high rigidity, it is preferable to use a propylene homopolymer.

The polypropylene resin (Y) does not particularly limit the production method as long as it satisfies the above-mentioned properties, but a preferable production method is a method of polymerizing propylene and necessary comonomer with a Ziegler-Natta type catalyst.

The Ziegler-Natta type catalyst is a catalyst system outlined in section 2.3.1 (pages 20 to 57) of the "Polypropylene Handbook" edited by Edward P. Moore Jr., the translation supervised by Tetsuo Yasuda and Mitsuru Sakuma, Kogyo Chosakai Publishing Co., Ltd. (1998). For example, it refers to a titanium trichloride-based catalyst comprising titanium trichloride and an organoaluminum halide, a magnesium-supported catalyst comprising a solid catalyst component essentially containing magnesium chloride, a titanium halide and an electron donor compound, an organic aluminum and an organosilicon compound, or a catalyst prepared by combining an organosilicon-treated solid catalyst component formed by contacting an organic aluminum and an organosilicon compound to a solid catalyst component, with an organic aluminum compound component.

The method for producing the polypropylene resin (Y) is not particularly limited, and it can be produced by any of conventionally known slurry polymerization method, bulk polymerization method, gas phase polymerization method and the like, and as long as it is within the range of the properties described above, it is also possible to produce a propylene homopolymer and a propylene random copolymer by using a multistage polymerization method.

3. Ratio of Polypropylene Resin (X) to Polypropylene Resin (Y)

The ratio of the polypropylene resin (X) to the polypropylene resin (Y) in the polypropylene resin composition according to the present invention is 5 to 30% by weight of the polypropylene resin (X) and 70 to 95% by weight of the polypropylene resin (Y) based on 100% by weight in total of (X) and (Y), preferably 7 to 27% by weight of the polypropylene resin (X) and 73 to 93% by weight of the polypropylene resin (Y), and more preferably 10 to 25% by weight of the polypropylene resin (X) and 75 to 90% by weight of the polypropylene resin (Y).

By setting the ratio in the above range, the film formation stability effect is obtained, the orientation in the film plane becomes uniform and the formation of the shish structure which is unlikely to cause cracks in the stretching process is suppressed, so that the microporous film can be stably formed, and rigidity can be maintained.

4. Additives

As necessary, the polypropylene resin composition according to the present invention can be used by adding the following various components other than the polypropylene resin (X) and the polypropylene resin (Y).

To the polypropylene resin composition used in the present invention, an additive such as an antioxidant can be added. Specifically, a phenol-based stabilizer typified by 2,6-di-t-butyl-p-cresol (BHT), tetrakis[methylene-3-(3,5-di-t-butyl-4-hydroxyphenyl)propionate]methane (manufactured by BASF Japan Ltd., trade name "IRGANOX 1010") and n-octadecyl-3-(4'-hydroxy-3',5'-di-t-butylphenyl)propionate (manufactured by BASF Japan Ltd., trade name "IRGANOX 1076"), a phosphite-based stabilizer typified by bis(2,4-di-t-butylphenyl)pentaerythritol diphosphite, tris(2,4-di-t-butylphenyl)phosphite and the like, an α-crystal nucleating agent typified by an aromatic carboxylic acid metal salt, an aromatic phosphoric acid metal salt, a sorbitol-based derivative and the like, a lubricant typified by a higher fatty acid amide and a higher fatty acid ester, an antistatic agent such as a glycerin ester or sorbitan ester of a C8 to C22 fatty acid and a polyethylene glycol ester, an anti-blocking agent typified by silica, calcium carbonate, talc and the like, or the like may be added. However, addition of a β-crystal nucleating agent is not desirable as it has a practical problem as described above.

Also, an ultraviolet absorber can be added. The ultraviolet absorber is a compound having an absorption band in the ultraviolet region, and triazole type, benzophenone type, salicylate type, cyanoacrylate type, nickel chelate type, inorganic fine particle type and the like are known. Among them, the most widely used one is triazole type.

As the ultraviolet absorber, examples of the triazole-based compound include 2-(2'-hydroxy-5'-methylphenyl)benzotriazole (trade name: Sumisorb 200, Tinuvin P), 2-(2'-hydroxy-5'-t-octylphenyl)benzotriazole (trade name: Sumisorb 340, Tinuvin 399), 2-(2'-hydroxy-3', 5'-di-t-butylphenyl)benzotriazole (trade name: Sumisorb 320, Tinuvin 320), 2-(2'-hydroxy-3',5'-di-t-amylphenyl)benzotriazole (trade name: Sumisorb 350, Tinuvin 328), and 2-(2'-hydroxy-3'-t-butyl-5'-methylphenyl)-5-chlorobenzotriazole (trade name: Sumisorb 300, Tinuvin 326). Examples of the benzophenone-based compound include 2-hydroxy-4-methoxybenzophenone (trade name: Sumisorb 110) and 2-hydroxy-4-n-octoxybenzophenone (trade name: Sumisorb 130).

Examples of the salicylate-based compound include 4-t-butylphenyl salicylate (trade name: Seesorb 202). Examples of the cyanoacrylate-based compound include ethyl (3,3-diphenyl)cyanoacrylate (trade name: Seesorb 501). Examples of the nickel chelate-based compound include nickel dibutyldithiocarbamate (trade name: Antigen NBC). Examples of the inorganic fine particle-based compound include $TiO_2$, $ZnO_2$, and $CeO_2$.

Also, a light stabilizer can be added. As the light stabilizer, it is common to use a hindered amine-based compound, which is called HALS. HALS has a 2,2,6,6-tetramethylpiperidine skeleton and cannot absorb ultraviolet rays, but suppresses photodegradation due to various functions. It is said that the three main functions are capture of radicals, decomposition of hydroxyl peroxide compounds, and capture of heavy metals that accelerate decomposition of hydroxyl peroxide.

As representative compounds for HALS, examples of the sebacate type compound include bis(2,2,6,6-tetramethyl-4-piperidyl) sebacate (trade name: Adekastab LA-77, Sanol LS-770), and bis(1,2,2,6,6-pentamethyl-4-piperidyl) sebacate (trade name: Sanol LS-765). Examples of the butanetetracarboxylate type compound include tetrakis(2,2,6,6-tetramethyl-4-piperidyl)-1,2,3,4-butanetetracarboxylate (trade name: Adekastab LA-57), tetrakis(1,2,2,6,6-pentamethyl-4-piperidyl)-1,2,3,4-butanetetracarboxylate (trade name: Adekastab LA-52), a condensate of 1,2,3,4-butanetetracarboxylic acid, 2,2,6,6-tetramethyl-4-piperidinol and tridecyl alcohol (trade name: Adekastab LA-67), and a condensate of 1,2,3,4-butanetetracarboxylic acid, 1,2,2,6,6-pentamethyl-4-piperidinol and tridecyl alcohol (trade name: Adekastab LA-62).

Examples of the succinic acid polyester type compound include a condensation polymer of succinic acid and 1-(2-hydroxyethyl)-4-hydroxy-2,2,6,6-tetramethylpiperidine. Examples of the triazine type compound include N,N'-bis (3-aminopropyl) ethylenediamine 2,4-bis{N-butyl-N-(1,2,2,6,6-pentamethyl-4-piperidyl)amino}-6-chloro-1,3,5-triazine condensate (trade name: Chimasorb 119), poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}] (trade name: Chimasorb 944), and poly[(6-morpholino-s-triazine-2,4-diyl){(2,2,6,6-tetramethyl-4-piperidyl)imino}hexamethylene{(2,2,6,6-tetramethyl-4-piperidyl)imino}] (trade name: Chimasorb 3346).

The amount of these additives used is not particularly limited, but is about 0.01 to 5 parts by weight based on 100 parts by weight of the total of the polypropylene resin (X) and the polypropylene resin (Y).

5. Polypropylene Resin Composition

The MFR of the polypropylene resin composition of the present invention is preferably 0.1 to 10 g/10 minutes, more preferably 0.5 to 7 g/10 minutes, and further preferably 1.0 to 5 g/10 minutes. When the MFR is 0.1 g/10 minutes or more, good fluidity is obtained and poor extrusion during film formation can be reduced. On the other hand, when the MFR is 10 g/10 minutes or less, uniformity of orientation in the film plane is maintained and excellent porous formation is obtained.

The MFR was measured under the conditions of 230° C. and 2.16 kg load in accordance with ISO 1133: 1997. The unit is g/10 minutes.

From the viewpoint of easier porous formation and the improved film formation stability, the elongational viscosity of the polypropylene resin composition of the present invention at a measurement temperature of 200° C. and an elongation rate of 10 $s^{-1}$ as determined by Cogswell method is preferably 7,500 Pa·s to 41,000 Pa·s, more preferably from 7,500 Pa·s to 35,000 Pa·s, and further preferably from 7,500 Pa·s to 30,000 Pa·s. When the elongational viscosity by the Cogswell method is 7,500 Pa·s or more, uniformity of orientation in the film plane is maintained and excellent porous formation is obtained. When the elongational viscosity by the Cogswell method is 41,000 Pa·s or less, the tearing phenomenon at the end of the die is suppressed and film formation stability is excellent.

6. Production of Polypropylene Resin Composition

Examples of a method for preparing the polypropylene resin composition include a method of mixing a powdery or pellet-shaped polypropylene resin (X), a polypropylene resin (Y), and optionally added additives with a dry blend, a Henschel mixer (registered trademark) or the like, and a method of further melt-kneading the mixture with a single screw extruder, a twin screw extruder or the like.

II. Microporous Film

1. Microporous Film

In the microporous film of the present invention, a stretched film in which a layer composed of the polypropylene resin composition is stretched is used.

The thickness of the microporous film is preferably 40 μm or less, and more preferably 30 μm or less.

The microporous film is a polymer film having a large number of micropores of 2 μm or less, and the Gurley air permeability measured in accordance with JIS P8117 described later is 10 sec/100 ml to 5000 sec/100 ml.

In the microporous film of the present invention, for the purpose of imparting a shutdown function as necessary, a microporous film composed of a polyolefin resin having a melting point of 120° C. to 140° C. other than the above polypropylene resin composition may be laminated. Preferred examples of the polyolefin resin having a melting point of 120° C. to 140° C. include a polyethylene resin.

In the case where the microporous film composed of the above polypropylene resin composition and the microporous film composed of the polyethylene resin are laminated, it is preferable that they are laminated so as to sandwich both surfaces of the microporous polyethylene film between the microporous films composed of the above polypropylene resin composition.

Furthermore, in order to impart heat resistance, in the microporous film of the present invention, a heat-resistant layer composed of inorganic fine particles can be laminated on the outermost layer of the film. The inorganic fine particles preferably contain at least one oxide or hydroxide of an element selected from Al, Si, Ti and Zr, and from the viewpoint of ease of availability, silica, alumina, aluminum hydroxide or aluminosilicate can be suitably used.

2. Method for Producing Microporous Film

The method for producing the microporous film is not particularly limited, and preferably comprises (A) a film forming process of forming a film composed of the above polypropylene resin composition (hereinafter referred to as a raw film), (B) a curing process of subjecting the raw film to an annealing treatment in a heating furnace, (C) a cold stretching process of stretching the annealed film under a temperature atmosphere of 0° C. or more and less than 90° C., and (D) a hot stretching process of stretching the film stretched in the cold stretching process at a temperature of 90° C. or more and less than the curing temperature. The method for producing the microporous film may comprise a further stretching process and a heat fixing process, in addition to the above processes.

(A) Film Forming Process

As a method for producing the raw film, it can be selected from a film forming method such as a T-die extrusion molding method, a blown film molding method, and a calendar molding method. Among them, the T-die extrusion molding method is preferable from the viewpoint of uniformity of film orientation and uniformity of film thickness.

The resin temperature at the time of melt-extruding the polypropylene resin composition by an extruder is preferably 180° C. or more and less than 260° C. When the resin temperature is 180° C. or more, the resin uniformly flows over the entire surface of the T-die, so that it is possible to obtain a film having a uniform film thickness. When the resin temperature is less than 260° C., orientation of the polypropylene resin composition improves in the orientation treatment of molten resin at a higher draft ratio described later, so that uniform pores are formed.

The draft ratio defined as a value obtained by dividing the lip opening degree (unit: μm) of the T-die by the thickness (unit: μm) of the raw film is preferably 70 or more and less than 300. When the draft ratio is 70 or more, sufficient orientation is imparted to the molten polypropylene resin composition, so that uniform pores are formed. Further, when the draft ratio is less than 300, tearing at the end of the T-die is suppressed, so that it is possible to obtain a raw film having a uniform film thickness.

Examples of a method for cooling the molten raw film extruded from the T-die include a method of bringing the molten raw film into contact with one cooling roll via an air discharged by an air knife unit or an air chamber unit, and a method of cooling by pressure bonding with a plurality of cooling rolls. The temperature of the cooling roll is preferably 40° C. to 130° C., and in the temperature within this range, the polypropylene resin composition can be sufficiently crystallized.

(B) Curing Process

The curing process of the raw film is carried out in order to grow a crystal lamella produced in the raw film in the film forming process by annealing the raw film in the heating furnace. As a result, cracks are generated between the lamellae in a stretching process described later, and small through holes can be formed starting from the cracks.

The curing temperature of the raw film means the atmospheric temperature in the heating furnace, and it is preferably 120° C. to 155° C. By setting the curing temperature in this temperature range, it is possible to grow the lamellae in the raw film without partial melting.

Examples of a method for curing the raw film include a method of curing by running the raw film via a roll installed in the heating furnace, and a method of holding the raw film in the heating furnace in a state of being wound into a roll. The curing method in a state of being wound into a roll is preferable since it is easy to adjust the curing time and it is possible to cure the raw film for a long time.

The curing time is preferably 5 minutes to 60 minutes when cured while running, and 1 hour to 30 hours when cured in a roll form.

(C) Cold Stretching Process

In the cold stretching process, the raw film is uniaxially stretched in the extrusion direction. In the cold stretching process, a large number of fine cracks are formed between the lamellae by stretching the film in a state that the lamellae are not dissolved, so that the temperature is preferably equal to the glass transition temperature or more and less than the α relaxation temperature of the polypropylene resin composition, and more preferably a temperature of 0° C. or more and less than 90° C.

When the stretch ratio is 1.05 times or more, cracks between the lamellae are easily formed, and when it is 1.50 times or less, rearrangement of the lamellae and disappearance of cracks are suppressed, so that the stretch ratio is preferably 1.05 to 1.50 times.

When the stretching speed is 0.5%/second or more, the productivity is excellent, and when it is 100%/second or less, breakage of the raw film is suppressed, so that the stretching speed is preferably 0.5%/second to 100%/second.

The stretching method of the raw film is not particularly limited as long as it can uniaxially stretch the raw film, and examples thereof include a chuck type stretching method used for a tensile test, that can stretch the raw film at a predetermined temperature, a pantograph batch stretching method, a tenter stretching method, and the like.

(D) Hot Stretching Process

In the hot stretching process, by stretching the film cold-stretched in the cold stretching process in the same direction as the cold stretching direction while maintaining the film at a predetermined stretching temperature, cracks between the lamellae produced by cold stretching are expanded, and pores of a size permeable to lithium ions are formed.

When the stretching temperature is 90° C. or more, rearrangement of the lamellae does not occur, and cracks tend to expand, and when the stretching temperature is less than the curing temperature, partial melting of the lamellae and clogging of cracks are suppressed, so that the stretching temperature is preferably 90° C. or more and less than the curing temperature.

When the stretch ratio is 1.5 times or more on the basis of the initial length in the cold stretching process, expansion of the crack is sufficient and results in excellent air permeability, and when it is 3.0 times or less, rearrangement of the lamellae and clogging of cracks are suppressed and excellent air permeability is obtained, so that the stretch ratio is preferably 1.5 to 3.0 times.

When the stretching speed is 0.1%/second or more, the productivity is excellent, and when it is 50%/second or less, nonuniformity of crack expansion is suppressed, so that the stretching speed is preferably 0.1%/second to 50%/second.

(Other Process)

As a further process, a heat fixing process may be included. The heat fixing process is a method of making the microporous film obtained by the above process not change in the dimension in the stretching direction, and is a process of heat shrinking the microporous film by imparting a temperature of 100° C. or more and 170° C. or less to the film reduced by 3 to 50% with respect to the length of the microporous film before heat fixing.

3. Use Applications

The microporous film of the present invention can be used for separators, filtration membranes, separation membranes and filters. In particular, the separator can be suitably used for small electronic devices such as mobile phones, smart phones, and notebook computers, and for batteries, particularly for high capacity secondary batteries such as hybrid electric vehicles and smart grid batteries.

EXAMPLES

Hereinafter, the present invention will be specifically described with reference to examples, but the present invention is not limited by these examples.

The evaluation methods and resins used in the examples and comparative examples are as follows.

1. Evaluation Method (1) Melt Flow Rate (MFR)

MFR was determined under conditions of 230° C. and 2.16 kg load in accordance with ISO 1133: 1997 Conditions M. The unit is g/10 minutes.

(6) Number of Gels

A film having a thickness of 25 μm was prepared with a CF-350 type film molding apparatus manufactured by Create Plastic K.K. (equipped with a CR45-25 type extruder, a double chill roll type film take-off machine (CR-400 type) and a winder). The number of gels of the film was counted by a CCD type defect detector (SCANTEC7000) manufactured by NAGASE & CO., LTD. The details are as follows.

A sample was put in a CR45-25 type extruder (diameter of 40 mm, L/D=25) having a full flight metering type screw and equipped with a straight manifold type T-die (350 type film die) with a width of 350 mm at the tip. The setting conditions of the extruder were selected according to the MFR of the sample from the conditions shown in Table 1. The screw rotation speed was 55 rpm. The molten resin extruded from the T-die was taken by a double chill roll type film take-off machine (CR-400 type) set at a cooling roll temperature of 40° C. to obtain an unstretched film.

The number of gels was counted at the center of the film, between the take-off machine and the winder, using the above defect detector. The inspection width and inspection length were respectively 10 mm width and 5 m length (inspection area 0.05 m$^2$), the number of inspections was 600, and the average value of the values obtained for each size section was calculated in terms of unit area.

TABLE 1

| MFR of polypropylene resin (g/10 minutes) | Molding conditions No. | Extruder conditions Set temperature(° C.) | | | | | | | Cooling role | Defect detector conditions | | Inspection width (mm) | Number of inspection (times) | Resolution | |
|---|---|---|---|---|---|---|---|---|---|---|---|---|---|---|---|
| | | C1 | C2 | C3 | AD | D1 | D2 | D3 | | Conversion parameter Black defect X | Y | | | X | Y |
| Less than 2.0 | (1) | 240 | 270 | 300 | 300 | 300 | 300 | 300 | 40 | 1.0 | 1.0 | 10 | 600 | 35 | 35 |
| 2.0 or more and less than 5.0 | (2) | 220 | 250 | 280 | 280 | 280 | 280 | 280 | 40 | 1.0 | 1.0 | 10 | 600 | 35 | 35 |
| 5.0 or more | (3) | 205 | 210 | 230 | 235 | 240 | 240 | 240 | 30 | 1.0 | 1.0 | 10 | 600 | 35 | 45 |

(2) Molecular Weight Distribution (Mw/Mn and Mz/Mn)

Mw/Mn and Mz/Mn were determined by GPC measurement according to the method described above.

(3) Melt Tension (MT)

MT was measured using CAPILOGRAPH manufactured by Toyo Seiki Seisaku-Sho, Ltd. under the following conditions.

Capillary: 2.0 mm in diameter and 40 mm in length
Cylinder diameter: 9.55 mm
Cylinder extrusion rate: 20 ram/minute
Take-off speed: 4.0 m/minute
Temperature: 230° C.

When MT is extremely high, the resin may break at a take-off speed of 4.0 m/minute. In such a case, the take-off speed is lowered by 0.1 m/minute, and a tension at the maximum speed in which the resin can be taken is defined as MT. The unit is gram (g).

(4) Branching Index (g')

Branching index g' was determined by GPC equipped with a differential refractometer (RI), a viscosity detector (Viscometer), and a light scattering detector (MALLS) as detectors according to the method described above.

(5) mm Fraction mm Fraction was measured by the method described in paragraphs [0053] to [0065] of JP 2009-275207 A using GSX-400, FT-NMR manufactured by JEOL Ltd. according to the method described above. The unit is %.

(7) Strain Hardening Degree (λmax)

The elongational viscosity was measured under the following conditions.

Apparatus: Ares manufactured by Rheometorics
Jig: Extentional Viscosity Fixture manufactured by TA Instruments
Measurement temperature: 180° C.
Strain rate: 0.1/sec
Preparation of test piece: Press-formed to prepare a sheet of 18 mm×10 mm and a thickness of 0.7 mm.

Details of the method of calculating λmax are as described above.

(8) Melting Point

The melting point was defined as a temperature of the endothermic peak top measured when, using a differential scanning calorimeter (DSC), the temperature was once raised to 200° C. to erase thermal history, then the temperature was lowered to 40° C. at a temperature decreasing rate of 10° C./minute, and raised again at a temperature increasing rate of 10° C./minute. The unit is ° C.

(9) Elongational Viscosity by Cogswell Method

The elongational viscosity by the Cogswell method was calculated based on the method described in F. N. Cogswell, Polym. Eng. Sci., 12, 64 (1972). The measurement conditions are as follows.

Apparatus: Rosand RH2000 twin capillary rheometer manufactured by Malvern
Die used: Long die length 16 mm, diameter 1 mm, inflow angle 180 degrees
Short die length 0.25 mm, diameter 1 mm, inflow angle 180 degrees
Set temperature: 200° C.
Set shear rate range: 10 to 3000 sec$^{-1}$ The elongational viscosity $$\eta_e \quad \text{[Expression 1]}$$

can be calculated based on the method described in the above-mentioned literature.

Here, a dedicated software "Flowmaster" was used. In software setting, Bagley correction was applied, and the shear rate dependence (Power low-n) of shear stress was set to "Quadratic". In this method, the elongational viscosity is obtained as a discrete numerical value with respect to the elongation rate $$\dot{\varepsilon} \quad \text{[Expression 2]}$$

determined according to the set shear rate. Therefore, in order to obtain elongational viscosity at a specific elongation rate, the elongational viscosity should be plotted with respect to the elongation rate, fitted by the following formula with A and B as variables, and appropriately interpolated or extrapolated.

$$\eta_e = A\dot{\varepsilon}^B \quad \text{[Expression 3]}$$

At this time, however, when the pressure loss on the short die side was lower than 0.3 MPa, the measurement accuracy was low and the data tended to be rough, so that the data was excluded from fitting.

Using the obtained variables A and B, the elongational viscosity by the Cogswell method was calculated by calculating the elongational viscosity $$\eta_e \quad \text{[Expression 5]}$$

at an elongation rate $$\dot{\varepsilon} = 10 \text{ s}^{-1} \quad \text{[Expression 4]}$$

2. Materials Used (1) Polypropylene Resin (X) Having Long Chain Branched Structure As the polypropylene resin (X), the following polypropylene resins were used.

(X-1): Propylene homopolymer having a long chain branch produced by macromer copolymerization method, trade name "WAYMAX (registered trademark) MFX3" manufactured by Japan Polypropylene Corporation (X-2): Propylene homopolymer having a long chain branch produced by macromer copolymerization method, trade name "WAYMAX (registered trademark) MFX6" manufactured by Japan Polypropylene Corporation (X-3): Propylene homopolymer having a long chain branch produced by macromer copolymerization method, trade name "WAYMAX (registered trademark) MFX8" manufactured by Japan Polypropylene Corporation (X-4): Propylene homopolymer having a long chain branch produced by a crosslinking method, trade name "Daproy (registered trademark) WB140HMS" manufactured by Borealis AG.

For these resins, MFR, GPC, melt tension (MT), branching index g', $^{13}$C-NMR, the number of gels, strain hardening degree (λmax), and melting point were evaluated. Evaluation results are shown in Table 2.

TABLE 2

| Evaluation item | Unit | Polypropylene resin (X) | | | |
| --- | --- | --- | --- | --- | --- |
| | | X-1 | X-2 | X-3 | X-4 |
| MFR | g/10 minutes | 9.5 | 2.1 | 1.6 | 2.2 |
| Melting point | ° C. | 154 | 154 | 154 | 158 |
| mm Fraction | % | 98 | 98 | 98 | 93 |
| Mw/Mn | — | 4.2 | 5.0 | 5.3 | 5.1 |
| Mz/Mw | — | 3.6 | 3.5 | 3.5 | 3.3 |
| Branching index g' in Mabs of 1,000,000 | — | 0.86 | 0.87 | 0.89 | 0.58 |
| MT | g | 5 | 18 | 23 | 19 |
| log(MT) | — | 0.72 | 1.26 | 1.37 | 1.28 |
| −0.9 × log(MFR) + 0.7 | — | −0.18 | 0.41 | 0.52 | 0.39 |
| λmax(0.1) | — | 9.0 | 12.0 | 14.1 | 27.1 |
| Gel (0.5 mm or more) | gels/m$^2$ | 0 | 0 | 0 | 42,314 |
| Gel (0.2 mm or more and less than 0.5 mm) | gels/m$^2$ | 1 | 3 | 0 | 1,169,429 |
| Gel (0.1 mm or more and less than 0.2 mm) | gels/m$^2$ | 3 | 13 | 2 | 2,800,961 |

(2) Polypropylene Resin (Y)

As the polypropylene resin (Y), the following polypropylene resins were used.

(Y-1): Propylene homopolymer having no long chain branch, trade name "Novatec (registered trademark) FY6H" manufactured by Japan Polypropylene Corporation, MFR=1.9 g/10 minutes, Tm=165° C., g'=1.00

(Y-2): Propylene homopolymer having no long chain branch, trade name "Novatec (registered trademark) EA9HD" manufactured by Japan Polypropylene Corporation, MFR=0.4 g/10 minutes, Tm=165° C., g'=1.00

(Y-3): Propylene homopolymer having no long chain branch, trade name "Novatec (registered trademark) FL1105F" manufactured by Japan Polypropylene Corporation, MFR=3.5 g/10 minutes, Tm=165° C., g'=1.00

(Y-4): Propylene homopolymer having no long chain branch, trade name "Novatec (registered trademark) FL4" manufactured by Japan Polypropylene Corporation, MFR=4.2 g/10 minutes, Tm=164° C., g'=1.00

(Y-5): Propylene homopolymer having no long chain branch, trade name "Novatec (registered trademark) SA3A" manufactured by Japan Polypropylene Corporation, MFR=11 g/10 minutes, Tm=161° C., g'=1.00

Example 1

1. Production of Resin Composition

10% by weight of (X-1) as the polypropylene resin (X) and 90% by weight of (Y-1) as the polypropylene resin (Y) were weighed, and mixed and stirred with a Henschel mixer (registered trademark) for 3 minutes. Then, using a twin-screw extruder "KZW-25" manufactured by TECHNOVEL CORPORATION with a screw diameter of 25 mm, the mixture was melt-kneaded at a screw rotation speed of 300 rpm and a kneading temperature of C1/C2/C3 to C7/head/die=150° C./180° C./230° C./230° C./230° C., the molten resin extruded from the strand die was taken out while being cooled and solidified in a cooling water tank, and the strands were cut into a diameter of 3 mm and a length of 2 mm using a strand cutter to obtain raw material pellets of the polypropylene resin composition. The MFR of the obtained raw material pellets of the polypropylene resin composition and the elongational viscosity by the Cogswell method are shown in Table 3.

2. Production of Raw Film

In the production of the raw film, a single layer film forming machine in which a T-die adjusted to a die width of 150 mm and a lip opening of 3.0 mm was connected to the tip of a single screw extruder having a diameter of 30 mm and L/D=32 was used. The obtained raw material pellets of the polypropylene resin composition were charged into an extruder and melt-extruded at a film forming temperature of 200° C. The discharge amount of the extruder was adjusted to be 0.6 kg/h. The melt-extruded film was cooled and solidified with a cooling roll which was temperature-controlled at 80° C. and rotated at 8 m/min, and wound up to obtain a raw film having a thickness of about 20 μm. The draft ratio was 150.

3. Curing of Raw Film

The obtained raw film wound on a paper tube was put in a speed dryer (Speed Dryer P0-120, manufactured by MATSUI MFG. CO., LTD.) adjusted to an atmospheric temperature of 140° C. and annealed for 6 hours, and thereafter, stored in a thermo-hygrostat chamber adjusted to 23° C., 50% RH for 24 hours to obtain a curing film.

4. Production of Microporous Film

The curing film was cut into a rectangle having a length of 35 mm and a width of 25 mm so that the film flow direction (MD direction) was the longitudinal direction. Using a uniaxial stretching machine (manufactured by Imoto machinery Co., LTD, ultracompact tensile tester with thermostatic chamber IMC-18E0) whose stretching part was covered with a heating furnace, the curing film was set in the stretching machine with a distance between chucks of 20 mm so that the stretching direction was the MD direction of the film. The curing film was stretched in the MD direction at 23° C. and 1.2 times at a stretching speed of 3%/s, and then stretched to 2.0 times at 115° C. without changing the stretching speed. Thereafter, the temperature in the heating furnace was cooled to 23° C. in a chucked state to obtain a microporous film.

5. Property Evaluation (1) Die End Stability

In the molding of the raw film described above, the end of the molten resin extruded from the die was visually observed for 5 minutes, and the die end stability was evaluated according to the criteria shown below.

o: The film can be stably formed without tearing the end even once during film molding.

Δ: Slight tearing occurs during film molding, but they quickly recover and stabilize, so that the thickness in the film flow direction is relatively uniform.

x: Tearing always occurs during film molding, and the thickness in the flow direction of the film is not uniform.

(2) Thickness

The thickness of the microporous film was measured using a dial gauge (ABS digimatic indicator, manufactured by Mitutoyo Corporation). The unit is μm.

(3) Fisheye (FE) Measurement

The raw film was cut into a size of 20 cm×8 cm, and five films were visually observed. A film not having a fisheye of a size of 0.2 mm or more in diameter was determined as o, and a film in which the fisheyes were scattered was determined as x.

(4) Air Permeability

The air permeability of the microporous film was measured using a Gurley type air permeability meter (manufactured by YASUDA SEIKI SEISAKUSHO, LTD., automatic Gurley type densometer) in accordance with JIS P8117. An attachment having a gasket inner diameter of 10 mm was mounted to a Gurley type air permeability meter and air permeability was measured. The obtained measured value was converted using the following formula (2), thereby defining the converted value as the air permeability measured at an inner diameter of the gasket of 28.6 mm. The unit is seconds/100 ml.

$$\text{Air permeability} = \text{Measured value}/(2.86)^2 \qquad \text{Formula (2)}$$

(5) Young's Modulus

As an index of rigidity, the tensile modulus (Young's modulus) of the curing film was measured in the film flow direction (MD) under the following conditions in accordance with JIS K7127-1989. The unit is MPa.

Sample shape: Strip
Sample length: 150 mm
Sample width: 15 mm
Distance between chucks: 100 mm
Crosshead speed: 1 ram/min The evaluation results of the obtained microporous film are shown in Table 3. Since the polypropylene resin composition satisfied all provisions, all evaluation results were also satisfactory.

Example 2

Evaluation was carried out in the same manner as in Example 1 except that the melt extrusion temperature was set to 240° C. in the production of the raw film. Evaluation results are shown in Table 3. All the evaluation results were satisfactory.

Example 3

Evaluation was carried out in the same manner as in Example 1 except that the polypropylene resin (X) was changed to (X-2) in the production of the resin composition. Evaluation results are shown in Table 3. All the evaluation results were satisfactory.

Example 4

Evaluation was carried out in the same manner as in Example 1 except that the polypropylene resin (X) was changed to (X-3) in the production of the resin composition. Evaluation results are shown in Table 3. All the evaluation results were satisfactory.

Example 5

Evaluation was carried out in the same manner as in Example 1 except that the polypropylene resin (Y) was changed to (Y-2) in the production of the resin composition. Evaluation results are shown in Table 3. Since the MFR of the polypropylene resin (Y-2) was as low as 0.4 g/10 minutes, slight tearing at the die end occurred in the production of the raw film, but there was no problem in practical use. Other evaluation results were satisfactory.

Example 6

Evaluation was carried out in the same manner as in Example 1, except for changing to 5% by weight of (X-1) as the polypropylene resin (X) and 95% by weight of (Y-1) as the polypropylene resin (Y) respectively in the production of the resin composition. Evaluation results are shown in Table 3. Since the blending amount of the polypropylene resin (X-1) reduced, slight tearing at the die end occurred in the production of the raw film, but there was no problem in practical use. Other evaluation results were satisfactory.

Example 7

Evaluation was carried out in the same manner as in Example 1, except for changing to 20% by weight of (X-1) as the polypropylene resin (X) and 80% by weight of (Y-1) as the polypropylene resin (Y) respectively in the production of the resin composition. Evaluation results are shown in Table 3. All the evaluation results were satisfactory.

Example 8

Evaluation was carried out in the same manner as in Example 1, except for changing to 30% by weight of (X-1) as the polypropylene resin (X) and 70% by weight of (Y-1) as the polypropylene resin (Y) respectively in the production of the resin composition. Evaluation results are shown in Table 3. Since the blending amount of the polypropylene resin (X-1) was the upper limit, it was considered that some shish structure was formed in the film plane, and the air permeability was slightly deteriorated, but there was no problem in practical use. Other evaluation results were satisfactory.

Example 9

Evaluation was carried out in the same manner as in Example 1 except that the polypropylene resin (Y) was changed to (Y-3) in the production of the resin composition. Evaluation results are shown in Table 3. All the evaluation results were satisfactory.

Example 10

Evaluation was carried out in the same manner as in Example 1 except that the polypropylene resin (Y) was changed to (Y-4) in the production of the resin composition. Evaluation results are shown in Table 3. All the evaluation results were satisfactory.

Comparative Example 1

Evaluation was carried out in the same manner as in Example 1, except for changing to 100% by weight of the polypropylene resin (Y-1) alone in the production of the resin composition. Evaluation results are shown in Table 4. Since the polypropylene resin (X) having a long chain branched structure was not contained, tearing at the die end frequently occurred in the production of the raw film, so that it was impossible to stably produce the film. In addition, since the orientation of the molecular chains in the film was insufficient, the film had poor rigidity.

Comparative Example 2

Evaluation was carried out in the same manner as in Comparative Example 1 except that the melt extrusion temperature was set to 240° C. in the production of the resin composition of Comparative Example 1. Evaluation results are shown in Table 4. Since the polypropylene resin (X) having a long chain branched structure was not contained, orientation of molecular chains in the film was insufficient in the production of the raw film, pores were not formed in the production of the microporous film, and it resulted in markedly poor air permeability.

Comparative Example 3

Evaluation was carried out in the same manner as in Comparative Example 1 except that the polypropylene resin (Y) was changed to (Y-2) in the production of the resin composition of Comparative Example 1. Evaluation results are shown in Table 4. Since the polypropylene resin (X) having a long chain branched structure was not contained and the elongational viscosity by the Cogswell method exceeded 41,000 Pa·s, tearing at the die end frequently occurred in the production of the raw film, and it was impossible to stably produce the film.

Comparative Example 4

Evaluation was carried out in the same manner as in Comparative Example 1 except that the polypropylene resin (Y) was changed to (Y-3) in the production of the resin composition of Comparative Example 1. Evaluation results are shown in Table 4. Since the polypropylene resin (X) having a long chain branched structure was not contained, tearing at the die end frequently occurred in the production of the raw film, so that it was impossible to stably produce the film. In addition, since the orientation of the molecular chains in the film was insufficient, the film had poor rigidity.

Comparative Example 5

Evaluation was carried out in the same manner as in Comparative Example 1 except that the polypropylene resin (Y) was changed to (Y-4) in the production of the resin composition of Comparative Example 1. Evaluation results are shown in Table 4. Since the polypropylene resin (X) having a long chain branched structure was not contained, orientation of molecular chains in the film was insufficient in the production of the raw film, pores were not formed in the production of the microporous film, and it resulted in markedly poor air permeability. In addition, since the orientation of the molecular chains in the film was insufficient, the film had poor rigidity.

Comparative Example 6

Evaluation was carried out in the same manner as in Example 1, except for changing to 20% by weight of (X-1) as the polypropylene resin (X) and 80% by weight of (Y-5) as the polypropylene resin (Y) respectively in the production of the resin composition. Evaluation results are shown in Table 4. Since the MFR of the polypropylene resin (Y-5) was as high as 11 g/10 minutes, orientation of molecular chains in the film was insufficient in the production of the raw film, pores were not formed in the production of the microporous film, and it resulted in markedly poor air permeability.

Comparative Example 7

Evaluation was carried out in the same manner as in Example 1, except for changing to 3% by weight of (X-1) as the polypropylene resin (X) and 97% by weight of (Y-1) as the polypropylene resin (Y) respectively in the production of the resin composition. Evaluation results are shown in Table 4. Since the blending amount of the polypropylene resin (X-1) was as small as 3% by weight, tearing at the die end frequently occurred in the production of the raw film, so that it was impossible to stably produce the film.

Comparative Example 8

Evaluation was carried out in the same manner as in Example 1, except for changing to 50° by weight of (X-1) as the polypropylene resin (X) and 50% by weight of (Y-1) as the polypropylene resin (Y) respectively in the production of the resin composition. Evaluation results are shown in Table 4. Since the blending amount of the polypropylene resin (X-1) was as large as 50° by weight, it was considered that many shish structures were formed in the film plane, and the air permeability was markedly deteriorated as 7000 sec/100 ml.

Comparative Example 9

Evaluation was carried out in the same manner as in Example 1 except that the polypropylene resin (X) was changed to (X-4) in the production of the resin composition.

Evaluation results are shown in Table 4. Since the polypropylene resin (X-4) contained numerous gels, a large number of FEs were observed in the raw film obtained by the production of the raw film, and the film tore from the FE part when stretched at 23° C. in the production of the microporous film, thus a microporous film could not be obtained.

TABLE 3

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Polypropylene resin (X) | Type | | X-1 | X-1 | X-2 | X-3 | X-1 | X-1 | X-1 | X-1 | X-1 | X-1 |
| | % by weight | | 10 | 10 | 10 | 10 | 10 | 5 | 20 | 30 | 10 | 10 |
| Polypropylene resin (Y) | Type | | Y-1 | Y-1 | Y-1 | Y-1 | Y-2 | Y-1 | Y-1 | Y-1 | Y-3 | Y-4 |
| | % by weight | | 90 | 90 | 90 | 90 | 90 | 95 | 80 | 70 | 90 | 90 |
| Polypropylene resin composition | MFR | g/10 minutes | 2.2 | 2.2 | 1.9 | 1.9 | 0.5 | 2.1 | 2.6 | 3.1 | 3.9 | 4.6 |
| | Elongational viscosity by Cogswell method | Pa·s | 16200 | 16200 | 18200 | 19000 | 40000 | 15600 | 17800 | 19100 | 12000 | 9000 |
| Film forming temperature | °C. | | 200 | 240 | 200 | 200 | 200 | 200 | 200 | 200 | 200 | 200 |
| Draft ratio | — | | 150 | 150 | 150 | 150 | 150 | 150 | 150 | 150 | 150 | 150 |
| Die end stability | — | | ○ | ○ | ○ | ○ | Δ | Δ | ○ | ○ | ○ | ○ |
| Fisheye (FE) | — | | ○ | ○ | ○ | ○ | ○ | ○ | ○ | ○ | ○ | ○ |
| Thickness | μm | | 20 | 20 | 20 | 20 | 20 | 20 | 20 | 19 | 20 | 20 |
| Air permeability | sec/100 ml | | 300 | 340 | 340 | 320 | 350 | 290 | 310 | 530 | 320 | 340 |
| Young's modulus (MD) | MPa | | 2460 | 2150 | 2380 | 2430 | 2380 | 2340 | 2700 | 2850 | 2270 | 2340 |

TABLE 4

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Polypropylene resin (X) | Type | | — | — | — | — | — | X-1 | X-1 | X-1 | X-4 |
| | % by weight | | — | — | — | — | — | 20 | 3 | 50 | 10 |
| Polypropylene resin (Y) | Type | | Y-1 | Y-1 | Y-2 | Y-3 | Y-4 | Y-5 | Y-1 | Y-1 | Y-1 |
| | % by weight | | 100 | 100 | 100 | 100 | 100 | 80 | 97 | 50 | 90 |
| Polypropylene resin composition | MFR | g/10 minutes | 1.9 | 1.9 | 0.4 | 3.5 | 4.2 | 11 | 2.0 | 4.3 | 1.9 |
| | Elongational viscosity by Cogswell method | Pa·s | 15100 | 15100 | 41300 | 10000 | 7200 | 11000 | 15300 | 22000 | 18200 |
| Film forming temperature | °C. | | 200 | 240 | 200 | 200 | 200 | 200 | 200 | 200 | 200 |
| Draft ratio | — | | 150 | 150 | 150 | 150 | 150 | 150 | 150 | 150 | 150 |
| Die end stability | — | | X | ○ | X | X | ○ | ○ | X | ○ | ○ |
| Fisheye (FE) | — | | ○ | ○ | ○ | ○ | ○ | ○ | ○ | ○ | X |
| Thickness | μm | | 20 | 17 | 20 | 19 | 17 | 16 | 20 | 18 | — |
| Air permeability | sec/100 ml | | 300 | >10000 | 270 | 700 | >10000 | >10000 | 290 | 7000 | — |
| Young's modulus (MD) | MPa | | 2210 | 1890 | 2190 | 1760 | 1770 | 2690 | 2240 | 2910 | — |

INDUSTRIAL APPLICABILITY

The polypropylene resin composition of the present invention is industrially extremely useful since the product defect rate can be reduced due to stabilization of porous formation by stabilizing film formation, and also the microporous film can be thinned due to high rigidity of the polypropylene resin composition.

The invention claimed is:

1. A separator for a battery which is composed of a polypropylene resin composition for a microporous film, wherein the composition comprises:
   - (A) 5 to 30% by weight of a polypropylene resin (X) having a long chain branched structure and the following properties (i) to (vi):
     - (i): an MFR of 0.1 to 30.0 g/10 min;
     - (ii): a molecular weight distribution wherein Mw/Mn is 3.0 to 10.0 and Mz/Mw is 2.5 to 10.0 by GPC;
     - (iii): a melt tension MT in grams satisfying the following formula:

$$\log(MT) \geq -0.9 \times \log(MFR) + 0.7 \text{ or } MT \geq 15;$$

- (iv): a branching index g' of 0.30 or more and less than 0.95;
     - (v): a mm fraction of propylene unit triads of 95% or more by $^{13}$C-NMR; and
     - (vi): when formed into an unstretched film having a thickness of 25 μm, a number of gels having a major axis of 0.5 mm or more of 10 gels/m$^2$ or less, and
   - (B) 70 to 95% by weight of a polypropylene resin (Y) having an MFR of 0.1 to 10 g/10 min and excluding the polypropylene resin (X).

2. The separator for a battery which is composed of a polypropylene resin composition for a microporous film of claim 1, wherein the polypropylene resin (Y) is a propylene homopolymer.

3. The separator for a battery which is composed of a polypropylene resin composition for a microporous film of claim 1, which has an elongational viscosity of 7,500 to 41,000 Pa·s as determined by the Cogswell method at a measurement temperature of 200° C. and an elongation rate of 10 s$^{-1}$.

4. A microporous film, comprising:
   at least one porous layer of a mixture of (A) and (B):
   - (A) 5 to 30% by weight based on the total weight of the mixture of a polypropylene resin (X) having a long chain branched structure and the following properties (i) to (vi):
     - (i): an MFR of 0.1 to 30.0 g/10 min;
     - (ii): a molecular weight distribution wherein Mw/Mn is 3.0 to 10.0 and Mz/Mw is 2.5 to 10.0 by GPC;
     - (iii): a melt tension MT in grams satisfying the following formula:

$$\log(MT) \geq -0.9 \times \log(MFR) + 0.7 \text{ or } MT \geq 15;$$

- (iv): a branching index g' of 0.30 or more and less than 0.95;
     - (v): a mm fraction of propylene unit triads of 95% or more by $^{13}$C-NMR; and
     - (vi): when formed into an unstretched film having a thickness of 25 μm, a number of gels having a major axis of 0.5 mm or more of 10 gels/m$^2$ or less, and
   - (B) 70 to 95% by weight based on total weight of the mixture of a polypropylene resin (Y) having an MFR of 0.1 to 10 g/10 min and excluding the polypropylene resin (X);

wherein the porous layer has a plurality of micropores of 2 μm or less and a thickness of 40 μm or less.

5. The microporous film of claim 4, having a Gurley air permeability measured in accordance with JIS P8117 of 10 sec/100 ml to 5,000 sec/100 ml.

6. The microporous film of claim 4, having a Gurley air permeability measured in accordance with JIS P8117 of 290 sec/100 ml to 530 sec/100 ml.

7. The microporous film of claim 4, which is a stretched film having a machine direction cold stretch ratio of 1.05 to 1.50 and/or a machine direction hot stretch ratio of 1.5 to 3.0.

8. The microporous film of claim 4, wherein the micropores are cracks formed between crystal lamellas in the microporous film.

9. The microporous film of claim 4, wherein the mixture has a MFR of 0.1 to 10 g/10 min.

10. The microporous film of claim 4, wherein the porous layer has a thickness of 19-40 μm.

11. The microporous film of claim 4, wherein the mixture of (A) and (B) has an elongational viscosity of 7,500 to 41,000 Pa·s as determined by the Cogswell method at a measurement temperature of 200° C. and an elongation rate of 10 s$^{-1}$.

12. A laminated porous film, comprising:
   a first layer and a second layer of the microporous film of claim 4 and a layer of a microporous polyethylene film, wherein the microporous polyethylene film is an inner film sandwiched between the first and second layers of the microporous film.

* * * * *